(No Model.)
R. M. HUNTER.
ELECTRIC RAILWAY.
No. 385,054. Patented June 26, 1888.
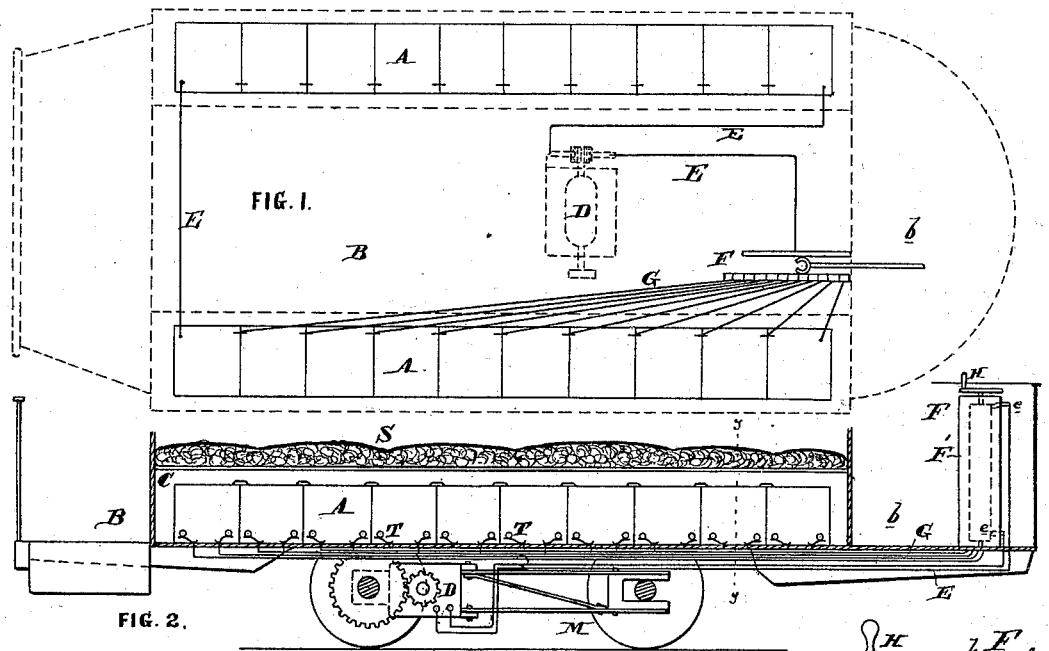
FIG. 1.
FIG. 2.
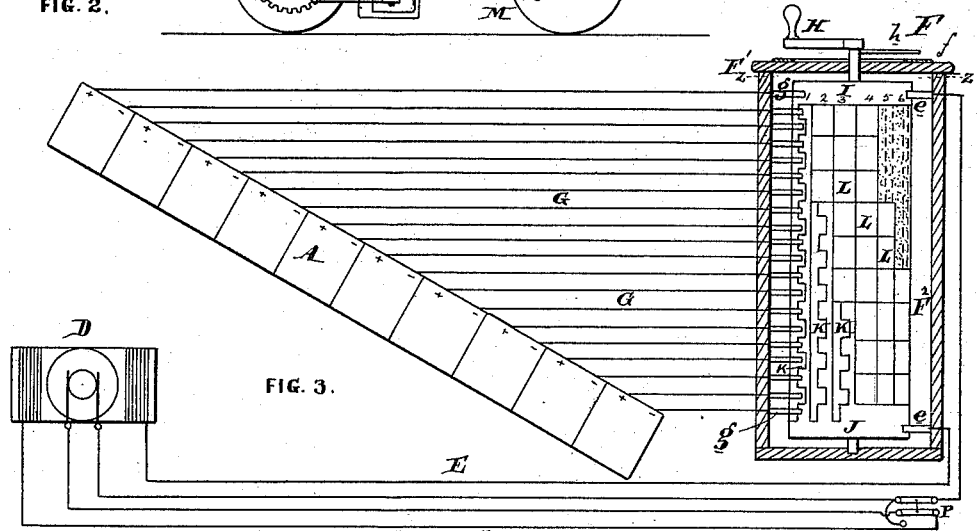
FIG. 3.
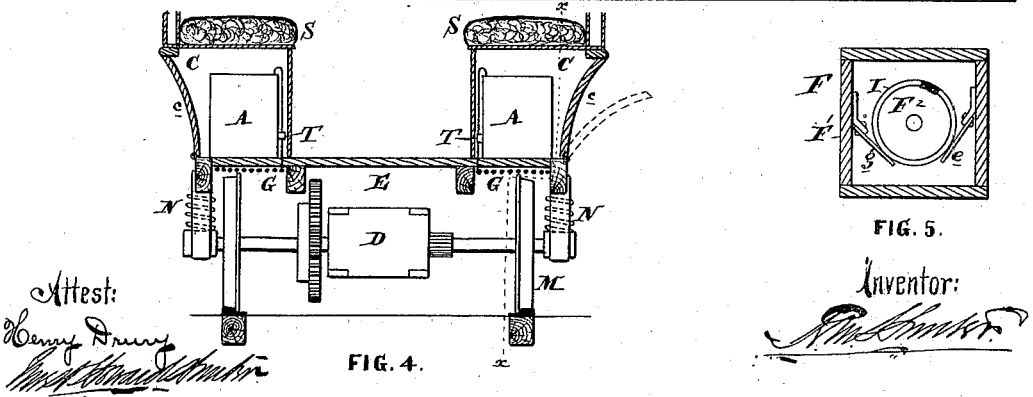
FIG. 4.
FIG. 5.
Attest:
Henry Drury
Inventor:

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 385,054, dated June 26, 1888.

Application filed January 20, 1888. Serial No. 261,403. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements which are fully set forth in the following specification, and shown in the accompanying drawings, which form part thereof.

My invention has particular reference to electrically-propelled cars or other vehicles in which the source of energy is carried upon the car in the form of batteries of any suitable description. Those which I prefer to use are known as secondary batteries or accumulators; but this invention, broadly considered, is not so limited. In practice I couple the motors and batteries in either of two systems, one of which contemplates the coupling of the batteries in different orders or connection, so as to modify their relative connection, as more fully hereinafter set out, and the other of which contemplates the use of the batteries in series and to simply modify the connections with the coils on the motors, leaving the connection of the batteries, *per se*, always the same. There may be a combination of these two methods of regulation, if desired; but it is not found necessary in practice. The former of these methods is carried out in the construction forming the subject-matter of this application. This arrangement of batteries and method of regulation of the current by a single operative handle is set out in my application, Serial No. 208,418, and filed July 19, 1886, and this application may be considered as a division of that application so far as this method broadly is concerned.

In carrying out my invention there are several ways in which the batteries may be coupled, viz: The cells may all be connected in series, and one cell at a time cut out or into circuit, or the cells may all be coupled from series connection to multiple connection, or a combination of these two. It is also evident that many other combinations are possible; but these will suffice to make my invention clear. The battery-cells are preferably placed under the seats in compartments and supported by the car-body on springs. The regulator is arranged within operative position of the operator on the front platform or other equivalent operative position. The motor is preferably supported by the axle and independent of the car-body, though this not absolutely necessary. However, in practice I have found it preferable. Circuits connect with the battery-cells and lead the current to the regulator, and thence to the motor; and it is desirable to make such circuits practically fixed upon the car and preferably under the floor-level, yet high up from the ground or road-bed. The batteries or cells are arranged above the floor-level and may connect with these circuits automatically while being placed within the compartment.

I do not limit myself to mere details of construction, as it is evident that they may be modified in various ways without in the least departing from the spirit of the invention.

In the drawings, Figure 1 is a plan view showing one method of coupling up batteries on a car, embodying my invention. Fig. 2 is a longitudinal section of a street-car on line $x\,x$ of Fig. 4, showing the arrangement of motor, batteries, regulator, and circuits on the car. Fig. 3 is a general view showing construction of one form of regulator and connections with batteries and motor. Fig. 4 is a cross-section of an electric car on line $y\,y$ of Fig. 2, and Fig. 5 is a cross-section of my regulator shown in Fig. 3 on line $z\,z$.

A represents the batteries or cells, which may be of any construction, size, or shape; but the type of battery preferred is what is known as the secondary battery or electrical accumulator. These batteries are preferably arranged in line, in any numbers found desirable for the purpose, and may be placed in the compartments C under the seats S of the car B, and which compartments may be provided with doors $c$, as shown in Fig. 4. The car-body is provided with the usual front or operator's platform, $b$, and is also supported upon the truck M by springs N in any of the well-known manners.

D is the electric motor, and is preferably supported by the axles and independently of the car-body. By this means the car-body with its load of batteries may rise and fall and without jarring the batteries while the car runs over irregular places in the road-bed, and, furthermore, the same bearing which supports the car-body is made to support the batteries also.

E is the motor-circuit, and connects the motor D with the regulator F upon the front platform by circuits E, and a circuit-reverser, P, may be used to reverse the current in the armature to reverse the motor.

G are the battery-circuits which connect the different cells with the regulator F. This regulator may be constructed in various ways, the form shown in Fig. 3 being perhaps the most desirable. In this case the terminals from the various batteries end in contact-brushes $g$, which work in contact with a cylinder, $F^2$, having its surface covered by conducting sections K and L, or combinations of these. The sections K couple the batteries in multiple for a current of large volume and small electro-motive force, while sections L couple the batteries in series for smaller volume of current but high electro-motive force. There are six sets of sections shown, viz: First, coupling batteries in multiple for large volume and small electro-motive force; second, in coupling batteries part in multiple and part in series for smaller current and higher electro-motive force; third, same as second, only for still smaller current and higher electro-motive force; fourth, coupling batteries all in series for still smaller current but higher electro-motive force; fifth, coupling batteries in series with three cells cut out, reducing power of battery; and, sixth, same as fifth, with five cells cut out. Continuous strips I and J are arranged on the respective ends for contact with the extreme positive and negative brushes $g$, and also for contact with the motor-circuit E by brushes $e$. This regulator is securely located within an insulated chamber or box, F', to be out of danger and to protect persons from contact with it, and an insulated handle, H, and pointer $h$ are used to rotate it and indicate upon a scale, $f$, what connection is made. At one position this regulator cuts the motor entirely out of circuit and at the same time cuts the batteries out of circuit also.

The circuits G and E are preferably arranged close up to the bottom of the car to be out of the way, (see Figs. 2 and 4,) and the batteries should be made with contacts T to automatically couple with the circuits G by the mere act of inserting them on the car.

The motor is preferably on the rear axle, and hence the circuits G E are looped, or a forward and return circuit, and the circuit E must have flexibility or equivalent connection to allow the car-body to rise and fall without breaking its continuity.

Any matters herein set out but not claimed are not dedicated to the public, but form subject-matter of other applications. For instance, the car with compartments under the seats combined with removable batteries and arranged over the wheels and supported on springs form subject-matter of my division applications Serial Nos. 271,923 and 272,123, of 1888; neither do I claim, broadly, the coupling up of the batteries automatically by the act of inserting them in position on the car, as that forms subject-matter of my applications above referred to also; neither do I claim the arrangement of the motor and battery circuits close up to the under part of the car-body, as that forms subject-matter of my application Serial No. 273,207, of 1888; and likewise the car having longitudinal seats with compartments, under them, and batteries in said compartments is not claimed here, as it forms subject-matter of my application Serial No. 272,123, of 1888.

Having now described my invention, what I claim as new, and desire to secure by Letters Patent, is—

1. The combination of a car, an electric motor carried thereby to propel it, a number of removable battery-cells having exposed terminals on the car and adapted to be coupled in series connection, a motor-circuit including the motor and batteries and fixed to the car having exposed terminals adapted to contact with the battery-terminals when the cells are placed in position, and thus automatically couple up the battery with the motor-circuit, and a regulator to vary the number of battery-cells in series connection with the motor.

2. The combination of a car or vehicle, an electric motor carried thereby to propel it, a mechanical power-transmitting connection between the motor and axle, a number of removable battery-cells having exposed terminals on the car, a flexible motor-circuit including the motor and battery-cells looped so as to extend to the forward part of the car, and having exposed terminals adapted to contact with the battery-terminals when the cells are placed in position, and thus automatically couple up the battery with the motor-circuit, and a regulator arranged at the front of the car in the motor-circuit and in reach of the operator to vary the current flowing from the battery-cells through the motor.

3. The combination of a car, an electric motor to propel it, a series of removable battery-cells having exposed terminals on the car, circuits including the motor and battery fixed to the car having exposed terminals adapted to contact with the battery-terminals when the cells are placed in position, and thus automatically couple up the battery with the motor, and a regulating device having a single operating-handle within reach of the operator to modify the electrical connection between the battery-cells and motor by coupling them up in series or multiple connection or combinations of these.

4. The combination of a car or vehicle, an electric motor carried thereby to propel it, a number of removable battery-cells having exposed terminals on the car, a motor-circuit including the battery-cells and motor fixed to the car or vehicle, and having exposed terminals adapted to contact with the battery-terminals when the cells are placed in position, and thus automatically couple up the battery with the motor-circuit, and a regulator in the motor-circuit to vary the current flowing from the battery-cells through the motor.

In testimony of which invention I hereunto set my hand.

RUDOLPH M. HUNTER.

Witnesses:
E. M. BRECKINREED,
HENRY DRURY.